(12) United States Patent
Buschsieweke et al.

(10) Patent No.: US 8,267,463 B2
(45) Date of Patent: Sep. 18, 2012

(54) DOOR IMPACT BEAM

(75) Inventors: Otto Buschsieweke, Paderborn (DE); Andreas Hitz, Erwitte (DE); Mirko Paare, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 86 days.

(21) Appl. No.: 12/718,182

(22) Filed: Mar. 5, 2010

(65) Prior Publication Data
US 2010/0230997 A1     Sep. 16, 2010

(30) Foreign Application Priority Data
Mar. 5, 2009   (DE) .......................... 10 2009 011 378

(51) Int. Cl.
*B60J 5/00*   (2006.01)
(52) U.S. Cl. .................................................. 296/146.6
(58) Field of Classification Search ............... 296/146.6, 296/146.1, 146.2, 146.5, 187.05, 187.12; 280/730.2, 751, 728.3; 293/102; 29/897.2; 49/502
See application file for complete search history.

(56) References Cited

U.S. PATENT DOCUMENTS

| | | | | |
|---|---|---|---|---|
| 4,850,636 A * | 7/1989 | McLaren et al. | ............ | 296/146.5 |
| 4,922,596 A * | 5/1990 | Wycech | ........................ | 29/897.2 |
| 5,123,694 A * | 6/1992 | DePierre et al. | ......... | 296/187.12 |
| 5,232,261 A * | 8/1993 | Kuroda et al. | ............. | 296/146.4 |
| 5,370,437 A * | 12/1994 | Alberda | ..................... | 296/146.6 |
| 5,404,690 A * | 4/1995 | Hanf | ............................ | 296/146.6 |
| 5,580,120 A * | 12/1996 | Nees et al. | ................... | 296/146.6 |
| 5,756,167 A * | 5/1998 | Tamura et al. | .................. | 428/31 |
| 5,785,376 A * | 7/1998 | Nees et al. | ................... | 296/146.6 |
| 5,813,718 A * | 9/1998 | Masuda et al. | ............. | 296/146.6 |
| 5,926,930 A * | 7/1999 | Tamura et al. | ................ | 29/33 D |
| 5,992,922 A | 11/1999 | Harbig et al. | | |
| 6,082,811 A * | 7/2000 | Yoshida | ................... | 296/187.03 |
| 6,196,619 B1 * | 3/2001 | Townsend et al. | ......... | 296/146.6 |
| 6,416,114 B1 * | 7/2002 | Topker et al. | ............. | 296/146.6 |
| 6,568,742 B2 * | 5/2003 | Seo | ............................ | 296/146.6 |
| 6,591,577 B2 * | 7/2003 | Goto et al. | ................. | 296/146.6 |
| 6,869,130 B2 * | 3/2005 | Bodin et al. | ............... | 296/146.6 |
| 6,896,314 B2 * | 5/2005 | Guiles | ........................ | 296/146.6 |
| 7,055,886 B2 * | 6/2006 | Guiles | ........................ | 296/146.6 |
| 7,144,072 B2 * | 12/2006 | Wallstrom et al. | ....... | 296/187.03 |
| 2002/0069609 A1 * | 6/2002 | Nees et al. | ................... | 52/735.1 |
| 2008/0189949 A1 * | 8/2008 | Vikstrom | ..................... | 29/897.2 |
| 2010/0230997 A1 * | 9/2010 | Buschsieweke et al. | .. | 296/146.6 |
| 2010/0242284 A1 * | 9/2010 | Danaj et al. | .................. | 29/897.2 |

FOREIGN PATENT DOCUMENTS

DE    43 40 033 A1    6/1995
EP    0 869 019 B1    10/1998

* cited by examiner

*Primary Examiner* — Kiran B Patel
(74) *Attorney, Agent, or Firm* — Henry M. Feiereisen LLC

(57) ABSTRACT

A door impact beam for a motor vehicle includes a formed metal sheet defined by a longitudinal axis and having a tubular cross section which has a closed circumference in a center portion of the metal sheet, and is configured with open circumference at both end portions of the metal sheet which adjoin the center portion in a direction of the longitudinal axis. Each end portion is defined by an opening angle which continuously increases from the center portion to respective ends of the end portions.

13 Claims, 2 Drawing Sheets

DOOR IMPACT BEAM

CROSS-REFERENCES TO RELATED APPLICATIONS

This application claims the priority of German Patent Application, Serial No. 10 2009 011 378.9, filed Mar. 5, 2009, pursuant to 35 U.S.C. 119(a)-(d), the content of which is incorporated herein by reference in its entirety as if fully set forth herein.

BACKGROUND OF THE INVENTION

The present invention relates, in general, to a door impact beam.

The following discussion of related art is provided to assist the reader in understanding the advantages of the invention, and is not to be construed as an admission that this related art is prior art to this invention.

Door impact beams are used in motor vehicles as door reinforcement to protect occupants from injury in the event of an impact from the side, and are typically made of tubes or tubular cross sections, for example extrusion profiles or also press parts. Tubular cross sections have the drawback that in areas in which stress is less they generally have a same cross section as in those areas which encounter maximum stress. For that reason, tubular profiles have been oversized in some areas. To optimize weight, it is therefore required to subsequently cut the tubular cross sections to size, causing separate manufacturing steps. This in turn adversely affects manufacturing costs.

It would therefore be desirable and advantageous to provide an improved door impact beam which obviates prior art shortcomings and is simple in structure with optimum weight and which can be produced in a cost-efficient manner.

SUMMARY OF THE INVENTION

According to one aspect of the present invention, a door impact beam for a motor vehicle includes a formed metal sheet defined by a longitudinal axis and having a tubular cross section which has a closed circumference in a center portion of the metal sheet, and is configured with open circumference at both end portions of the metal sheet which adjoin the center portion in a direction of the longitudinal axis, each said end portions defined by an opening angle which continuously increases from the center portion to respective ends of the end portions.

The final configuration of the door impact beam is already established by the contour of the metal sheet which has been cut to size, i.e. there is no need for a later manufacturing step. The weight is optimized therefore beforehand. The manufacturing process is more cost-efficient than would be the case when a tubular structure has to be cut to size later.

According to another advantageous feature of the present invention, a reinforcement plate can be arranged in the center portion along an inner side of the metal sheet and may extend about a circumferential area of less than 360°. The reinforcement plate bears flatly upon and is secured to the later inner side of the door impact beam of the metal sheet which is still unformed but cut to size. The reinforcement plate may be connected to the metal sheet by material union or formfittingly, e.g. through welding, clinching/compression. A subsequent forming step involved a forming of the patched metal sheet in such a way that the center portion has a closed cross section whereas the end portions have an open, round cross section. Also the reinforcement plate receives its final configuration during forming of the metal sheet. The forming process is preferably executed in two stages. In a first stage, the metal sheet is formed into a U-shape. The second stage involves the shaping into the partly closed O-shaped cross sectional contour.

The opening angle of the end portions increases from the central portion of the door impact beam to the ends of the end portions. The increase is advantageously continuous in the absence of jumps so as to prevent stress peaks. The cross sectional configuration, i.e. the radius, the elliptic or, when overlap is involved, helical contour of the cross section remains hereby preferably constant.

In an unformed initial state, the center portion of the metal sheet may have a rectangular geometry with preferably parallel length sides, followed in longitudinal direction by trapezoidal end portions, respectively, which taper to their free end.

The transition between the end portions and the central portion may be configured in such a way that the distance of the length sides of the end portions in this transition is smaller than a width of the center portion. Thus, there is a stepped width with a stepped jump in the transition. It is, of course, also conceivable to make the distance of the length sides the same as the width of the center portion.

The reinforcement plate arranged in the center portion of the door impact beam may conform to the geometry of the center portion and also configured in the form of a rectangle. In this case, the reinforcement plate is spaced from the length sides in the center portion and has a length which corresponds to 40% to 100%, preferably 40% to 70%, of a length of the center portion. A flat contact of the reinforcement plate upon the center portion provides a local reinforcement of the door impact beam at a location where maximum stress is encountered in the event of a side impact. The wall thickness of the metal sheet can be reduced by optimizing the cut and suitable positioning of the reinforcement plate, resulting overall in a weight reduction.

According to another advantageous feature of the present invention, the metal sheet may have length side zones which overlap in the center portion. It may also be conceivable to shape the metal sheet in such a way that the length sides are end-to-end in the center portion. Both cases result in a center portion of the door impact beam having the closed and in relation to the end portions more stable cross section for attaining the necessary stiffness. The length side zones or the length sides of the metal sheet can then be connected to one another, e.g. welding, locally in two regions through material union.

After the forming process, the end portions have a toroidal cross section. As a consequence of the trapezoidal shape of the end portions in the unformed state, an opening angle increases in a direction towards the free ends of the end portions. The opening angle may theoretically start at 0°, preferably it may start in a range from 10° to 100°. At the free ends of the end portions, the opening angle may range between 120° and 180°, so that the required stability of the door impact beam is still ensured also at the end portions. Advantageously, the opening angle is 180°. To optimize the door impact beam, the end portions may be configured differently, for example with respect to their length.

According to another advantageous feature of the present invention, the opening angle of the reinforcement plate, realized during forming, may be greater than the opening angle of the end portions in the transition to the center portion. In this way, the section modulus is especially high in the center portion. Of course, it is not precluded within the scope of the invention to select the angle identical or smaller when the door impact beam should be less stiff.

The geometry of the door impact beam is governed by the cut of the metal sheet so that additional refinishing operations can be omitted in order to optimize weight. It is also conceivable within the scope of the invention, to provide fastening brackets directly, when the metal sheet is cut to size, for allowing attachment of the door impact beam to a door structure. The fastening brackets are brought into the desired position, when the metal sheet is formed. Of course, it is also possible to provide fastening brackets as separate components on the free ends of the end portions. This causes, however, an additional manufacturing step.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
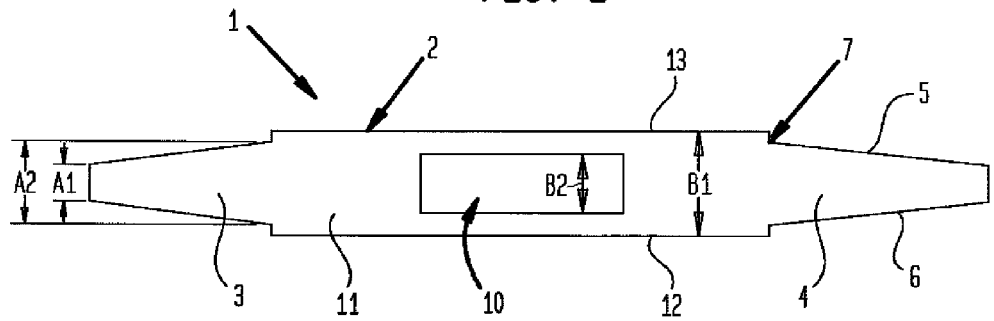
FIG. 1 is a schematic illustration of an unformed metal sheet for a door impact beam.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a metal sheet, generally designated by reference numeral 1, in its still unformed initial state, for producing a door impact beam. The metal sheet 1 has a center portion 2 of rectangular shape. Adjoining both sides of the center portion 2 in longitudinal direction are trapezoidal end portions 3, 4, respectively. The end portions 3, 4 have length sides 5, 6 at distances A1, A2 which are greater in a transition 7 to the center portion 2 than at the free ends 8, 9 of the end portions 3, 4. In this non-limiting exemplified embodiment, the distances A1, A2 for both end portions 3, 4 are of same size. Of course, it is equally conceivable to make the distances from end portion to end portion different.

The distance A2 of the length sides 5, 6 in the transition 7 to the center portion 2 is smaller than a width B1 of the center portion 2. In accordance with another, not shown, embodiment, a distance of the length sides of the end portions may be made of same size in the transition to the center portion as the width of the center portion in order to attain a transition, substantially free of notch stress, from the end portions to the center portion.

A reinforcement plate 10 bears approximately in the middle of the center portion 2 flatly upon the later inner side 11 of the metal sheet 1 and has a length L1 (FIG. 2) which is about 50% of a length L2 of the center portion 2. In addition, the reinforcement plate 10 has a width B2 which is smaller than a width B1 of the center portion 2 so that the reinforcement plate 10 does not extend beyond the length sides 12, 13 of the center portion 2. As a result, the door impact beam is reinforced at a location where maximum stress can be expected.

Figure 2:
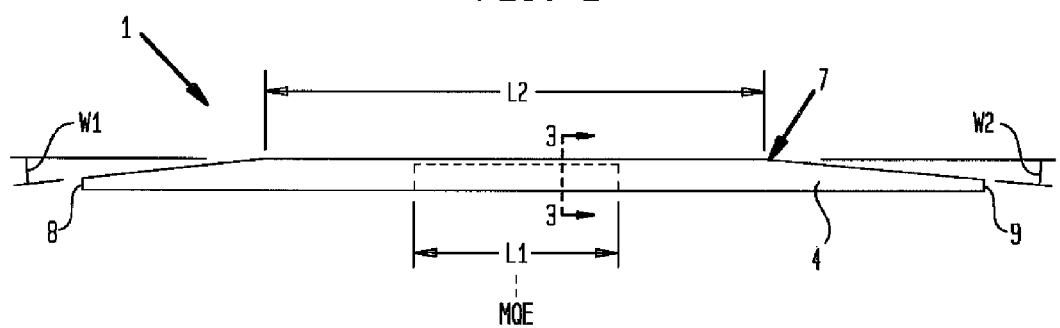
FIG. 2 is a side view of the metal sheet of FIG. 1 after undergoing a forming process.

FIG. 2 shows a side view of the metal sheet 1 after the latter has been shaped into a tubular profile with circular cross section. As a consequence of the trapezoidal configuration of the end portions 3, 4, the latter taper continuously starting from the transition 7 to the free ends 8, 9. The length sides 5, 6 of the end portions 3, 4 and an imaginary prolongation of the length sides 12, 13 of the center portion 2 define hereby angles W1, W2, respectively, of at least 10° at the free ends 8, 9 of the end portions 3, 4. The angles W1, W2 of the end portions 3, 4 may hereby differ, for example as a consequence of a different length of the end portions 3, 4. The door impact beam may therefore be configured asymmetric in relation to its transverse center axis MQE.

Figure 3:
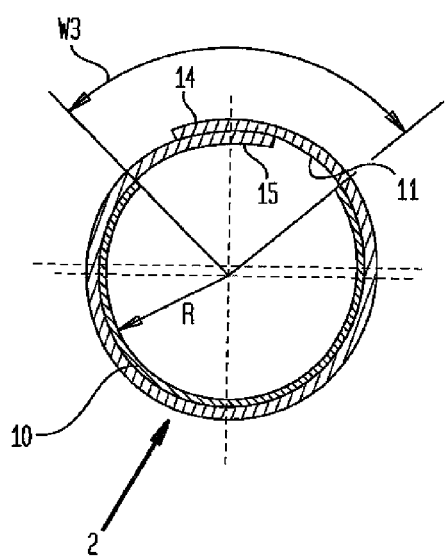
FIG. 3 is a cross section of one variation of a formed metal sheet.

FIG. 3 shows a cross section of center portion 2 of a formed metal sheet 1 with a round, tubular cross section. The inner radius is designated with R. In this embodiment, the metal sheet 1 has been shaped in such a way that the length side zones 14, 15 of the metal sheet 1 overlap. It can be seen that the reinforcement plate 10 does not extend beyond the length side zones 14, 15 of the center portion 2 but rests evenly and flatly upon the inner side 11 of the metal sheet 1. The opening angle W3 of the reinforcement plate 10 and the radius R can be defined by the degree of overlap of the length side zones 14, 15.

Figure 4:
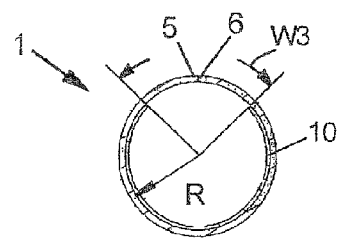
FIG. 4 is a cross section of another variation of a formed metal sheet.

A further possibility of a cross sectional configuration of the metal sheet 1 is shown in FIG. 4. In this case, the metal sheet 1 is shaped in such a way that the length sides 5, 6 are joined end-to-end. In this embodiment, the opening angle W3 is greater than the opening angle W3 of the reinforcement plate 10 of FIG. 3.

The joining process for the embodiment of FIG. 3 as well as for the embodiment of FIG. 4 may be realized through material union for example.

Figure 5:
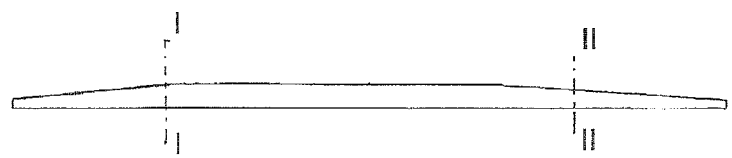
FIG. 5 is a side view of a formed metal sheet.

FIG. 5 shows a side view of the formed metal sheet 1 of FIG. 4 with two section planes I-I and II-II.

Figure 6:
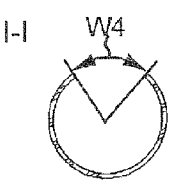
FIG. 6 is a cross section of end portions of the metal sheet, taken along the line I-I in FIG. 5.
Figure 7:
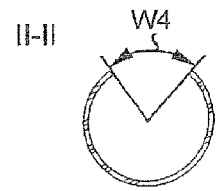
FIG. 7 is a cross section of end portions of the metal sheet, taken along the line II-II in FIG. 5.

FIGS. 6 and 7 show cross sections of the section planes I-I, of the end portions 3, 4 of FIG. 5. As can be seen, the opening angle W4 of the end portions 3, 4 is smaller in the transition 7 to the center portion 2 than the opening angle W3 of the reinforcement plate 10. As a consequence of the trapezoidal shape of the end portions 3, 4, the opening angle W4 is greater to the free ends 8, 9 than the opening angle W3 of the reinforcement plate 10, however not greater than 180°.

Figure 8:
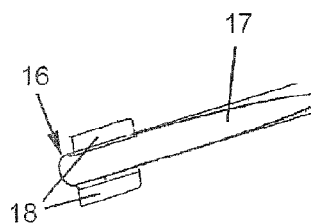
FIG. 8 is a schematic illustration of a free end of an end portion.

FIG. 8 shows a free end 16 of an end portion 17 formed in one piece with attachment brackets 18 for securement of the door impact beam to a door. The attachment brackets 18 may be provided already at a time when the basic shape of the unbent metal sheet is cut.

Figure 9:
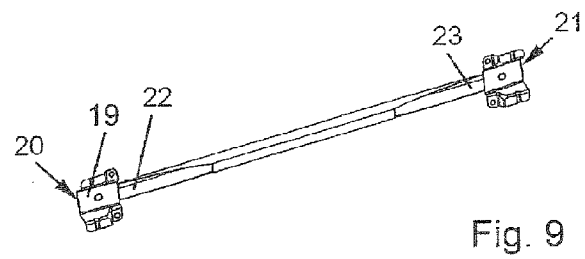
FIG. 9 is a schematic illustration of a formed metal sheet with press parts.

FIG. 9 shows a door impact beam in accordance with the invention with separate attachment brackets 19 at the free ends 20, 21 of the end portions 22, 23 for attachment to a door.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A door impact beam for a motor vehicle, comprising:
   a formed metal sheet defined by a longitudinal axis and having a tubular cross section which has a closed circumference in a center portion of the metal sheet, and is configured with open circumference at both end portions of the metal sheet which adjoin the center portion in a direction of the longitudinal axis, each said end portions defined by an opening angle which continuously increases from the center portion to respective ends of the end portions; and
   a reinforcement plate located inside the center portion at the inner side of the formed metal sheet.

2. The door impact beam 1, wherein the metal sheet has length side zones which overlap in the center portion.

3. The door impact beam 1, wherein the metal sheet has length sides joined end-to-end in the center portion.

4. The door impact beam of claim 1 wherein the reinforcement plate is defined by an opening angle which is greater than the opening angle of the end portions in a transition to the center portion.

5. The door impact beam 1, wherein the opening angles of the end portions are differently sized in a transition to the center portion.

6. The door impact beam of claim 1, wherein the reinforcement plate is arranged at a distance to length sides in the center portion.

7. The door impact beam 1, wherein the opening angle of the end portions ranges from 10° to 100° in a transition to the center portion.

8. The door impact beam 1, wherein the opening angle of the end portions ranges between 120° and 180° at a free end of the end portions.

9. The door impact beam of claim 3, wherein the length sides and/or length side zones of the metal sheet are joined through material union in at least two areas.

10. The door impact beam of claim 1, wherein the reinforcement plate has a length which is 40% to 100% of a length of the center portion.

11. The door impact beam of claim 1, wherein the reinforcement plate has a length which is 40% to 70% of a length of the center portion.

12. The door impact beam 1, further comprising attachment brackets formed in one piece with the end portions and disposed at ends of the end portions for attachment of a door.

13. The door impact beam 1, further comprising separate attachment brackets connected at opposite ends of the end portions for attachment of a door by material union or interference fit.

* * * * *